(No Model.)
I. M. HILL.
WEIGHING SCALE.
No. 497,241. Patented May 9, 1893.
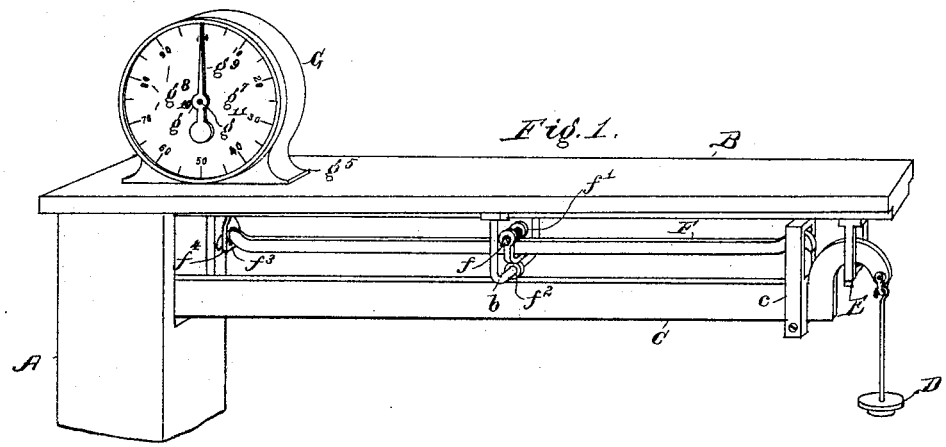
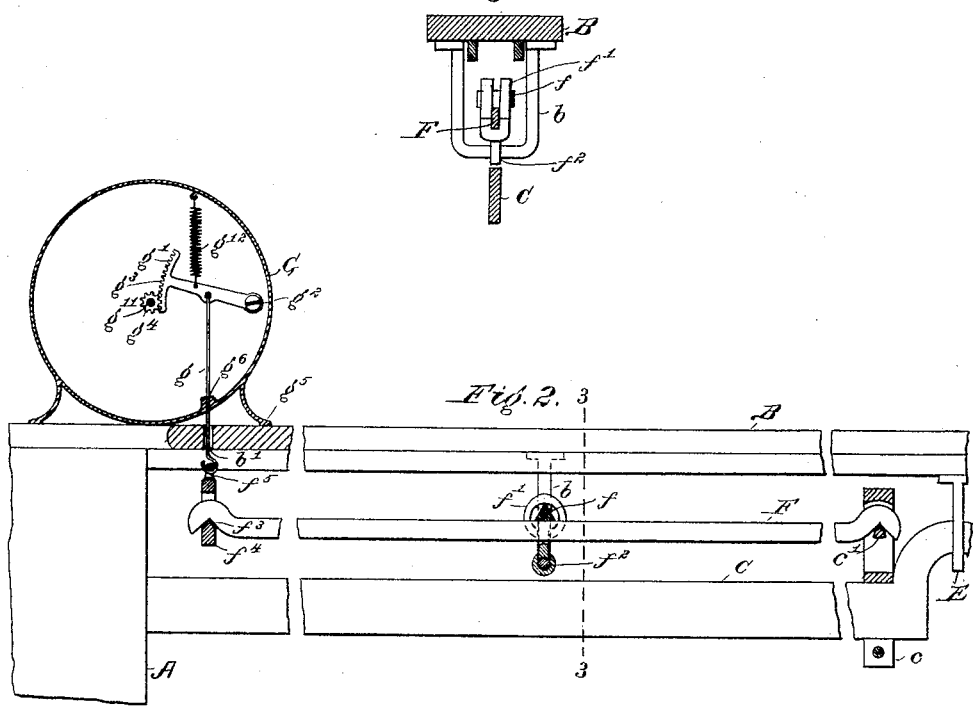
Witnesses
Hinkley Hyde
Myrtie C. Beals.
Inventor
Ira M. Hill,
By Albert M. Moore,
His Attorney.

UNITED STATES PATENT OFFICE.

IRA M. HILL, OF BOSTON, MASSACHUSETTS, ASSIGNOR OF ONE-HALF TO ROBERT CROSBIE, OF SAME PLACE.

WEIGHING-SCALE.

SPECIFICATION forming part of Letters Patent No. 497,241, dated May 9, 1893.

Application filed July 8, 1890. Serial No. 358,054. (No model.)

*To all whom it may concern:*

Be it known that I, IRA M. HILL, a citizen of the United States, residing at Boston, in the county of Suffolk and Commonwealth of Massachusetts, have invented a certain new and useful Improvement in Weighing-Scales, of which the following is a specification.

My invention relates to weighing-scales and consists in means hereinafter described and claimed of accurately weighing a load and of immediately indicating the total weight of the load without the necessity of shifting weights.

In the accompanying drawings, Figure 1 is an isometric perspective view of a part of the vertical post of a platform scale, the horizontal arm supported thereon, the scale-beam and counterpoise and my improvement applied to said scale-beam and arm; Fig. 2, a side elevation of said post, arm (partly in section), scale-beam, and the lever which connects said scale-beam and the indicating apparatus and a vertical section of said indicating apparatus, the knife-edges upon which said lever rests, the loops supporting said knife-edges, the knife-edge carried by said lever and the fulcrum-loops; Fig. 3, a vertical transverse section on the line 3—3 in Fig. 2.

The vertical post A, horizontal arm B, scale-beam C (except as hereinafter stated), counterpoise D, loop E, surrounding the scale-beam near its free end and secured to the arm B, are all of the usual construction, as found in platform-scales.

The scale-beam is commonly provided with numbered graduations and a poise or weight is adjustable on said scale-beam toward and from the fulcrum of said scale-beam, to balance the load upon the platform, the figure pointed out by the poise on the scale-beam, when the load and poise balance each other, indicating the weight. I dispense with the poise and the graduations on the scale-beam.

It is evident that if a poise of a given weight, for instance, one pound, will when placed as near as possible to the free end of the scale-beam, balance a load of one hundred pounds placed on the platform of the scale, then the force of the upward pressure of the scale-beam, at the point where the poise is placed, will equal one pound and that, if the poise be removed and the force of this upward pressure be applied to one end of a lever of the first class, having equal arms, the other end of the lever will move downward with an equal force, and that, if said last-named end of said lever be connected to a weight-indicating device having a movable pointer capable of indicating the weight of one pound by the greatest movement of said pointer, said load of one hundred pounds on the platform will cause a complete movement of said pointer and, if the movement of said pointer be resisted by a spring, a smaller load will move said pointer a less distance and that the whole distance traveled by said pointer may be graduated into one hundred parts, to indicate pounds, or into a greater number of parts, to indicate fractions of pounds. I therefore secure to the scale-beam a loop $c$, having an upwardly-pointing knife-edge $c'$, and on said knife edge I rest one end of a lever F, having an upwardly-pointing knife-edge $f$, secured to said lever between its ends and extending on opposite sides of said lever through openings in the ends of the stirrup or loop $f'$, said loop $f'$ having an eye $f^2$ in the middle of its closed lower end which surrounds the closed lower end of a U-shaped loop $b$ secured to the under side of the arm B, the other end of said lever resting upon a knife-edge $f^3$ secured in a loop $f^4$ having an eye $f^5$ in the upper part thereof, engaged by a vertical link $g$ which connects said loop $f^4$ to a gear-sector $g'$ between the pivot $g^2$ and the toothed circumference $g^3$ of said gear-sector. The teeth of the gear-sector engage with a pinion $g^4$, arranged centrally in the cylindrical case G, said case having a suitable base $g^5$ to rest upon the horizontal arm B and there being suitable openings $b'$ $g^6$ in said arm and case respectively to admit said link $g$. The case G has a suitable circular face $g^7$ provided with numbered graduations $g^8$, over which travels the longer pointed arm $g^9$ of a pointer or indicator $g^{10}$, secured to the shaft $g^{11}$ of said pinion $g^4$. Obviously, an upward movement of the free end of the scale-beam will raise the outer end of the lever F, rocking said lever upon its fulcrum or knife-edge $f$ and throwing down the other end of said lever F and producing a movement of the pointer over the scale on the dial or circular face $g^7$. The downward movement of the link $g$ and the above-described movement of the pointer is resisted by a spiral spring $g^{12}$, connected to the sector $g'$ and to the case G above said sector, and the contraction of said spring restores said sector to position and returns the pointer to the starting point, which is indicated by the figures 100, in Fig. 1, but might equally well be represented by 0, when the load is removed from the platform.

It is evident that if the dial be properly graduated the pointer will indicate thereon the weight of the load upon the platform.

When the load is placed upon the platform, the end of the scale-beam frequently vibrates laterally, in such a manner as to cause a friction upon the lever F and lessen its sensitiveness, were it not that the eye $f^2$ of the bearing loop $f'$ is large enough to move freely on the horizontal lower part of the loop $b$ and that said horizontal part of said last-named loop is long enough to allow the outer end of said lever to move freely as the scale-beam sways laterally, while the inner end of said lever, or end nearest the post A, remains substantially at rest.

I claim as my invention—

1. The combination of the scale-beam, the lever, the outer end of which is connected to the free end of said scale-beam and is moved by the rising of the same, a weight-indicating device connected to the other end of said lever and operated by the movement thereof, a knife-edge secured to said lever between its ends and a laterally-movable fulcrum to receive said knife-edge, to allow said lever to move laterally with said scale-beam, as and for the purpose specified.

2. The combination of the scale-beam, the lever, the outer end of which is connected to the free end of said scale-beam and is moved by the rising of the same, a weight-indicating device, connected to the other end of said lever and operated by the movement thereof, a knife-edge secured to said lever between its ends, a bearing-loop, to receive said knife-edge and having an eye, and a stationary horizontal bar arranged in said eye at right angles to said lever, said eye being loose on said bar, to allow said lever to move laterally with said scale-beam, as and for the purpose specified.

In witness whereof I have signed this specification, in the presence of two attesting witnesses, this 16th day of May, A. D. 1890.

IRA M. HILL.

Witnesses:
ALBERT M. MOORE,
ROBERT CROSBIE.